Feb. 6, 1934.  P. RUDOLPH  1,945,570
LENS SYSTEM
Filed Sept. 26, 1932

Fig. 1

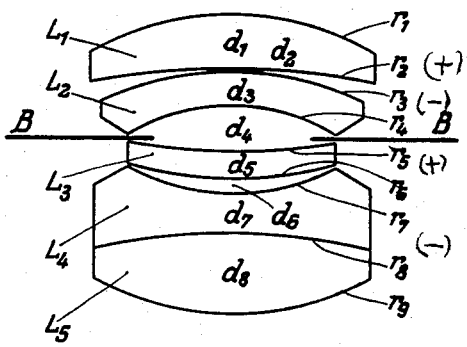

| | |
|---|---|
| $r_1 = +26,62$ mm | $d_1 = 5,19$ mm |
| $r_2 = +70,65$ mm | $d_2 = 0,13$ mm |
| $r_3 = +28,70$ mm | $d_3 = 3,25$ mm |
| $r_4 = +17,53$ mm | $d_4 = 6,50$ mm |
| $r_5 = -57,14$ mm | $d_5 = 2,60$ mm |
| $r_6 = -35,71$ mm | $d_6 = 1,30$ mm |
| $r_7 = -20,78$ mm | $d_7 = 3,38$ mm |
| $r_8 = +57,14$ mm | $d_8 = 7,80$ mm |
| $r_9 = -27,08$ mm | |

Fig. 2

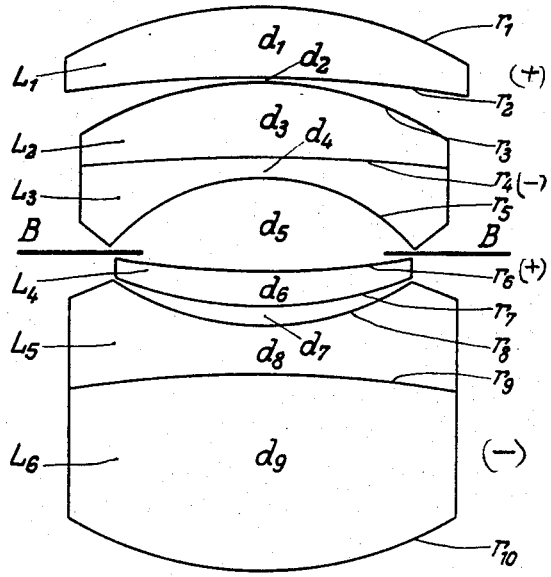

| | |
|---|---|
| $r_1 = +37,65$ mm | $d_1 = 7,00$ mm |
| $r_2 = +113,82$ mm | $d_2 = 0,18$ mm |
| $r_3 = +31,70$ mm | $d_3 = 7,00$ mm |
| $r_4 = +148,84$ mm | $d_4 = 2,10$ mm |
| $r_5 = +19,09$ mm | $d_5 = 8,76$ mm |
| $r_6 = -80,55$ mm | $d_6 = 3,50$ mm |
| $r_7 = -37,65$ mm | $d_7 = 1,75$ mm |
| $r_8 = -25,71$ mm | $d_8 = 4,55$ mm |
| $r_9 = +113,82$ mm | $d_9 = 18,91$ mm |
| $r_{10} = -35,72$ mm | |

Inventor:
Paul Rudolph.
By Jones, Addington, Ames & Seibold.
Attys.

Patented Feb. 6, 1934

1,945,570

UNITED STATES PATENT OFFICE 1,945,570

LENS SYSTEM

Paul Rudolph, Grossbiesnitz, near Gorlitz, Germany

Application September 26, 1932, Serial No. 634,849, and in Germany October 5, 1931

5 Claims. (Cl. 88—57)

My invention relates to a lens system and more particularly to a lens system of strong illuminative power and comprising four components separated from each other by air spaces.

The lens system described in the following specification has substantially the same arrangement as the lens system of my application Serial No. 141,474, which resulted in United States Letters Patent No. 1,812,717, and it shares with the latter the advantage of reduced zone correction for spherical and chromatic aberrations. It contains, however, a simplification with respect to its cost of manufacture, since even for a lens system of a greater illuminative ratio than 1:3.2 (the example of my aforesaid Patent 1,-812,717), it is made up of only four elements instead of five, and it also contains further improvement in that the defective anastigmatic planar correction of the said example is corrected and relieved of spherical and chromatic aberrations. The effective aperture also has been increased to 1:2.7, i. e. it is an f 2.7 lens.

My new lens system has the following composition:

Two inner components of opposite sign bound a biconvex lenticular air space, which divides the lens system into two sections, each of collective effect, the components of the said two sections when positioned serially to make up the lens system having alternating opposing signs; i. e. they are alternately collective and dispersive. The collective component adjacent the lenticular biconvex air space being of concavo-convex shape and having a focal length which is less than three times the focal length of the entire lens system. The novel effect is attained by having at least one of the two dispersive components made up of one collective element and one dispersive element cemented to each other, the glass of which the dispersive element is made having an index of refraction of at least 1.59 for $n_D$.

The example of said Patent 1,812,717 shows two dispersive components, each made up of a collective and a dispersive element, the latter being made of a glass having an index of refraction for $n_D$ of only 1.575.

In the drawing accompanying the present specification:

Figure 1 shows the outline of the axial cross section of a lens system embodying my invention; and Fig. 2 shows the outline of the axial cross section of another embodiment of my invention, the oncoming light being assumed as coming from above.

Of the embodiments illustrated in the drawing, Example 1 is shown in Fig. 1 and Example 2 in Fig. 2. In Example 1, it is only the final negative component $L_4$, $L_5$ which is made up of two elements cemented together. In the second example, however, the component 2, composed of the elements $L_2$, $L_3$ and the component $L_5$, $L_6$ are each built up of two elements cemented together. In both of these examples there is used for the negative section of the dispersive component a glass, the index refraction of which is greater than 1.59 for for $n_D$.

In the following tables the characters agree with those of the drawing.

EXAMPLE 1

Lens system with the aperture ratio 1:3.8 and focal length 100 millimeter. B indicates the diaphragm

| Radii | Thicknesses and spacings | Glass composition |
|---|---|---|
| $r_1=+26.62$ mm. | $d_1=5.19$ mm. | $n_D$ |
| $r_2=+70.65$ mm. | $d_2=0.13$ mm. | $L_1=L_3=L_5:1.6579$  51.4 |
| $r_3=+28.70$ mm. | $d_3=3.25$ mm. | $L_2:1.6475$  33.9 |
| $r_4=+17.53$ mm. | $d_4=6.50$ mm. | $L_4:1.6070$  40.2 |
| $r_5=-57.14$ mm. | $d_5=2.60$ mm. | |
| $r_6=-35.71$ mm. | $d_6=1.30$ mm. | |
| $r_7=-20.78$ mm. | $d_7=3.38$ mm. | |
| $r_8=+57.14$ mm. | $d_8=7.80$ mm. | |
| $r_9=-27.08$ mm. | | |

EXAMPLE 2

Ratio of apertures 1:2.7. Focal length 100 mm.

| Radii | Thicknesses and spacings | Class composition |
|---|---|---|
| $r_1=+37.65$ mm. | $d_1=7.00$ mm. | $n_D$ |
| $r_2=+113.82$ mm. | $d_2=0.18$ mm. | $L_1=L_2=L_4=L_6:1.6701$  47.3 |
| $r_3=+31.70$ mm. | $d_3=7.00$ mm. | $L_3:1.6475$  33.9 |
| $r_4=+148.84$ mm. | $d_4=2.10$ mm. | $L_5:1.6362$  35.4 |
| $r_5=+19.09$ mm. | $d_5=8.76$ mm. | |
| $r_6=-80.55$ mm. | $d_6=3.50$ mm. | |
| $r_7=-37.65$ mm. | $d_7=1.75$ mm. | |
| $r_8=-25.71$ mm. | $d_8=4.55$ mm. | |
| $r_9=+113.82$ mm. | $d_9=18.91$ mm. | |
| $r_{10}=-35.72$ mm. | | |

Further modifications will be apparent to those skilled in the art and it is desired, therefore, that the invention be limited only by the prior art and the scope of the appended claims.

Having thus described my invention, what I claim and desire to secure by Letters Patent is:

1. A rapid lens system consisting of four components separated from each other by air-spaces, the two internal components being of different sign and serving to bound a bi-convex air space which serves to divide the lens system into two collective members, whose individual components are of opposite sign; at least one of the two meniscus-shaped dispersive components consisting of a collective element and a dispersive element cemented to each other, the dispersive element being made of a glass whose index of refraction is at least 1.59 for $n_D$.

2. A rapid lens system consisting of two collective members each made up of, respectively, a collective and a dispersive individual lens, the said individual air-separated lenses alternating in sign, and being arranged in the order: collective, dispersive, collective, dispersive; at least the final dispersive member being made up of two individual lenses cemented together, the glass of one of said lenses having an index of refraction of not less than 1.59 for $n_D$.

3. A rapid lens system of high illuminating power consisting of the following components in the order named as viewed in the direction of oncoming light rays:—a collective lens, an air space, a dispersive lens, a bi-convex air space, a second collective lens, an air space and a second dispersive lens, the latter consisting of two elements cemented together and one of which is made of glass having a refractive index of not less than 1.59 for $n_D$.

4. A rapid lens system of high illuminating power consisting of the following components in the order named as viewed in the direction of oncoming light rays: a convexo-concave collective lens, an air space, a concavo-convex dispersive lens, a bi-convex air space, a convexo-concave collective lens, an air space, and a concavo-convex dispersive lens, the last-mentioned lens consisting of two elements cemented together, at least one of said elements being made of a glass having a refractive index of at least 1.59 for $n_D$.

5. A rapid lens system of high illuminating power consisting of the following components in the order named as viewed in the direction on oncoming light rays: a convexo-concave collective lens, an air space, a concavo-convex dispersive lens consisting of two elements cemented together, a biconvex air space, a convexo-concave collective lens, an air space, and a concavo-convex dispersive lens consisting of two elements cemented together; in which system at least one of the compound components has an element made of glass having a refractive index not less than 1.59.

PAUL RUDOLPH.